United States Patent [19]

Kamlukin et al.

[11] Patent Number: 4,726,440
[45] Date of Patent: Feb. 23, 1988

[54] UNITIZED FRAME FOR A SELF-PROPELLED LAWN MOWER

[75] Inventors: Igor Kamlukin, Mequon; Edward Freier, Jr., Port Washington; Donald G. Penkoske, West Bend, all of Wis.

[73] Assignee: Simplicity Manufacturing, Inc., Port Washington, Wis.

[21] Appl. No.: 47,717

[22] Filed: May 7, 1987

[51] Int. Cl.⁴ .............................................. B62D 21/00
[52] U.S. Cl. ..................................... 180/312; 280/781
[58] Field of Search .................. 180/311, 312; 280/781

[56] References Cited

U.S. PATENT DOCUMENTS

| | | | |
|---|---|---|---|
| 3,002,782 | 10/1961 | Jahn | 280/781 |
| 3,110,518 | 11/1963 | Wessells, III | 280/781 |
| 3,309,759 | 3/1967 | Vittone | 280/781 |
| 3,311,186 | 3/1967 | Kamlukin | 180/53.1 |
| 4,311,204 | 1/1982 | Shupert | 180/54.1 |
| 4,416,109 | 11/1983 | Slazas | 280/112 A |
| 4,532,755 | 8/1985 | Schemelin et al. | 56/16.6 |
| 4,621,699 | 11/1986 | Slazas | 180/53.7 |

*Primary Examiner*—John J. Love
*Assistant Examiner*—Kenneth R. Rice
*Attorney, Agent, or Firm*—James E. Nilles

[57] ABSTRACT

A unitized frame for a self-propelled lawn mower and fabricated from stamped sheet steel and steel beams welded together. The frame includes a stamped sheet steel component having a forward end that includes an upwardly and forwardly inclined portion which forms an operator's footrest and having a pair of downwardly extending side portions formed integrally therewith to form front wheel axle supports. The sheet steel component also forms an intermediate stepped portion that forms a transmission mounting, and it also has a rearward stepped portion forming an engine mounting. The unitized frame also includes a rear wheel mounting member welded to and between the rear ends of the pair of steel beams; the rear wheels mounting member is of generally U-shaped cross-section fabricated sheet steel and on which can be pivotally mounted a pair of rear steerable wheels about a fore-and-aft extending axis. The frame also has sheet reinforcing gussets stamped into the downwardly extending opposite side portions of the frame and which act to reinforce the front wheel axle supports.

9 Claims, 5 Drawing Figures

UNITIZED FRAME FOR A SELF-PROPELLED LAWN MOWER

BACKGROUND OF THE INVENTION

1. Field of Use

The present invention pertains to rotary, self-propelled, riding lawn mowers and more particularly to the frame of such a mower and on which is mounted the engine, the transmission, the mower, and the operator's platform.

2. Related Art

The apparatus of the present invention is in the nature of an improvement over frame constructions such as shown in the U.S. Pat. No. 4,311,204, issued Jan. 19, 1982. That patented construction and other prior art devices generally utilized a combination of different parts to fabricate the main frame, such as castings, sheet metal, or steel members.

Prior art devices to which the present invention pertains generally are also shown in the U.S. Pat. No. 4,621,699, issued Nov. 11, 1986 to Slazas, U.S. Pat. No. 4,532,755, issued Aug. 6, 1985 to Schemelin et al, U.S. Pat. No. 4,416,109, issued Nov. 22, 1983 to Slazas, or U.S. Pat. No. 3,311,186, issued Mar. 28, 1967 to Kamlukin. All of these patents have been assigned to an assignee common with the present invention.

SUMMARY OF THE INVENTION

The present invention provides a unitized frame for a self-propelled lawn mower, which frame is fabricated from stamped sheet steel and steel beams which are welded together to form a unitized frame. The frame includes a stamped sheet steel component having a forward end that includes an upwardly and forwardly inclined portion which forms an operator's footrest; said portion also has a pair of downwardly extending side portions formed integrally therewith and which form front wheel axle supports. The sheet steel component also forms an intermediate stepped portion that forms a transmission mounting, and it also has a rearward stepped portion forming an engine mounting. A particularly rigid and strong sheet steel component is provided by means of the integrally formed axle supports and stepped mounting portions for the engine and transmission.

Another aspect of the present invention relates to a unitized frame as above described and which includes a rear wheel mounting member welded to and between the rear ends of said pair of steel beams. Still a further aspect relates to such a frame having sheet steel reinforcing gussets formed by being stamped into the downwardly extending opposite side portions of the frame and which act to reinforce the front wheel axle supports.

Another aspect of the invention relates to the frame of the above type and in which the rear wheel mounting member is of generally U-shaped cross-section fabricated sheet steel and on which can be pivotally mounted a pair of rear steerable wheels about a fore-and-aft extending axis.

Generally, the present invention provides a unitized frame which is particularly strong and rigid and is economically fabricated to provide a multiplicity of functions and for supporting various components of the tractor.

These and other objects of the present invention will appear hereinafter as this disclosure progresses, reference being had to the accompanying drawings.

DESCRIPTION OF A PREFERRED EMBODIMENT

Figure 1:
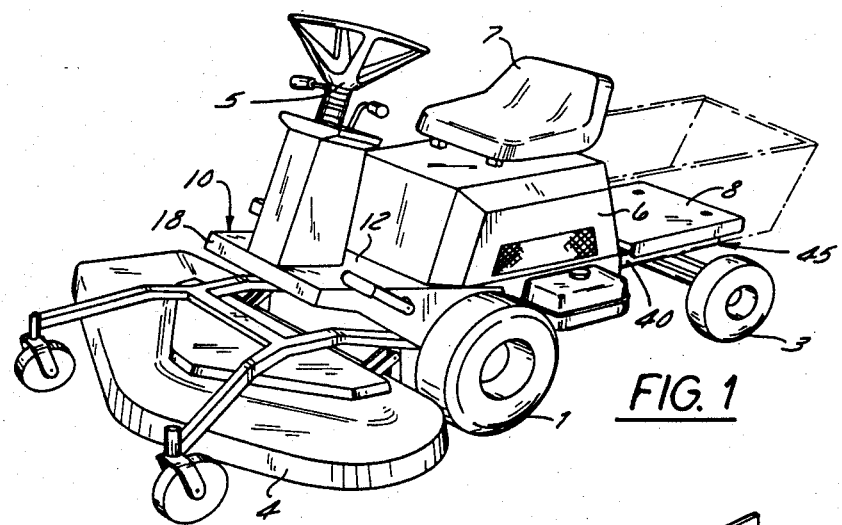
FIG. 1 is an overall perspective view of the tractor embodying the present invention.

As shown in FIG. 1, the mower assembly usable with the present invention includes a pair of laterally spaced traction wheels 2, a pair of rear steerable wheels 3, a front mounted mower deck 4, a steering column 5, a sheet metal housing 6 for the engine, an operator's seat 7, and a rear tiltable platform 8.

Figure 2:
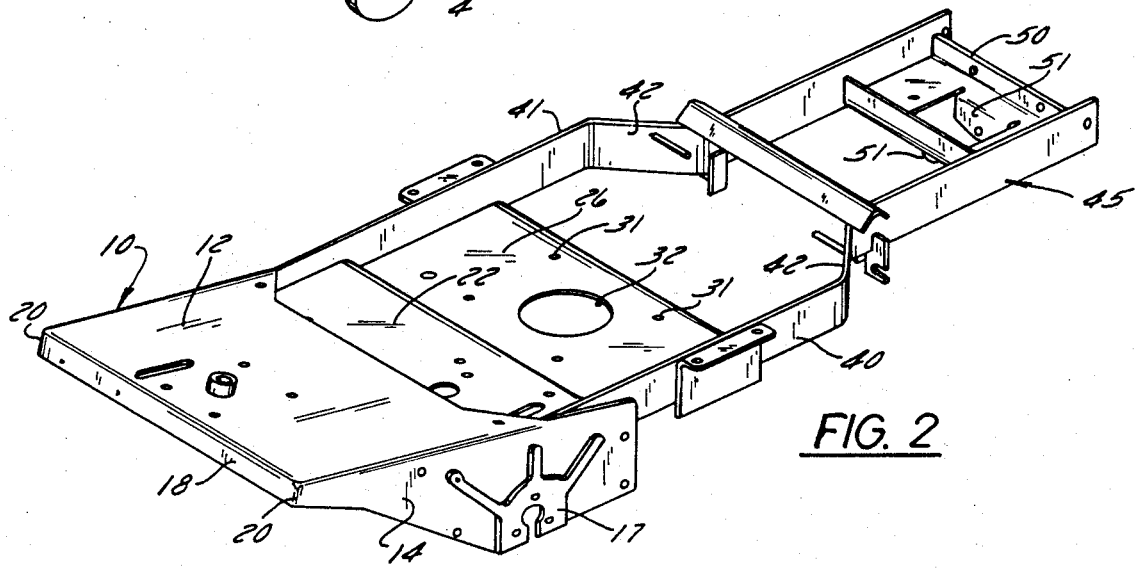
FIG. 2 is a perspective view of the frame made in accorddance with the present invention and is utilized in the tractor in FIG. 1, but showing the frame on an enlarged view.
Figure 3:
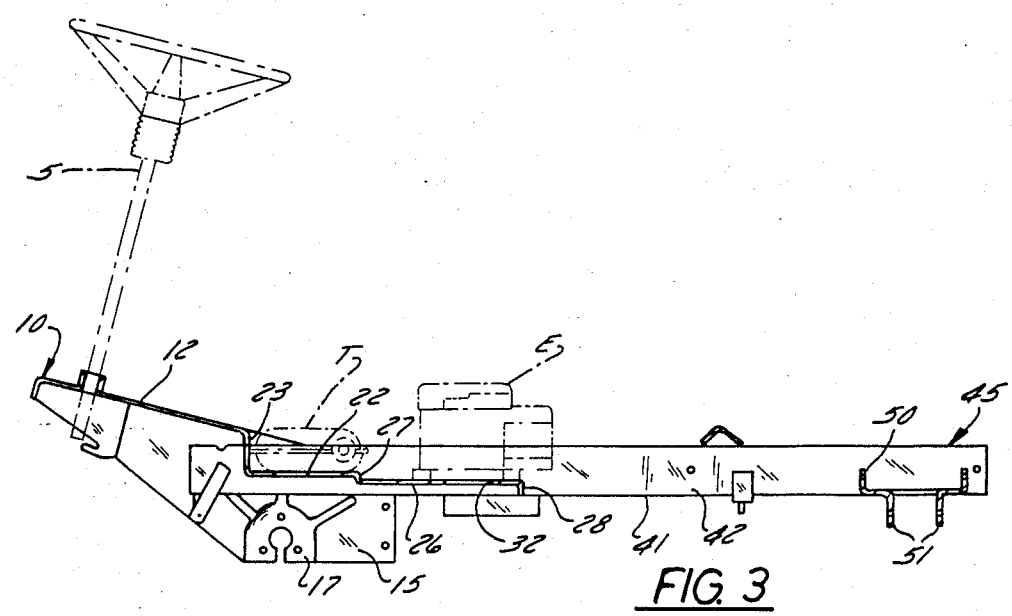
FIG. 3 is a longitudinal cross-sectional view through the frame shown in FIG. 2, and showing certain components mounted thereon such as the steering column, the transmission, and the engine.
Figure 4:
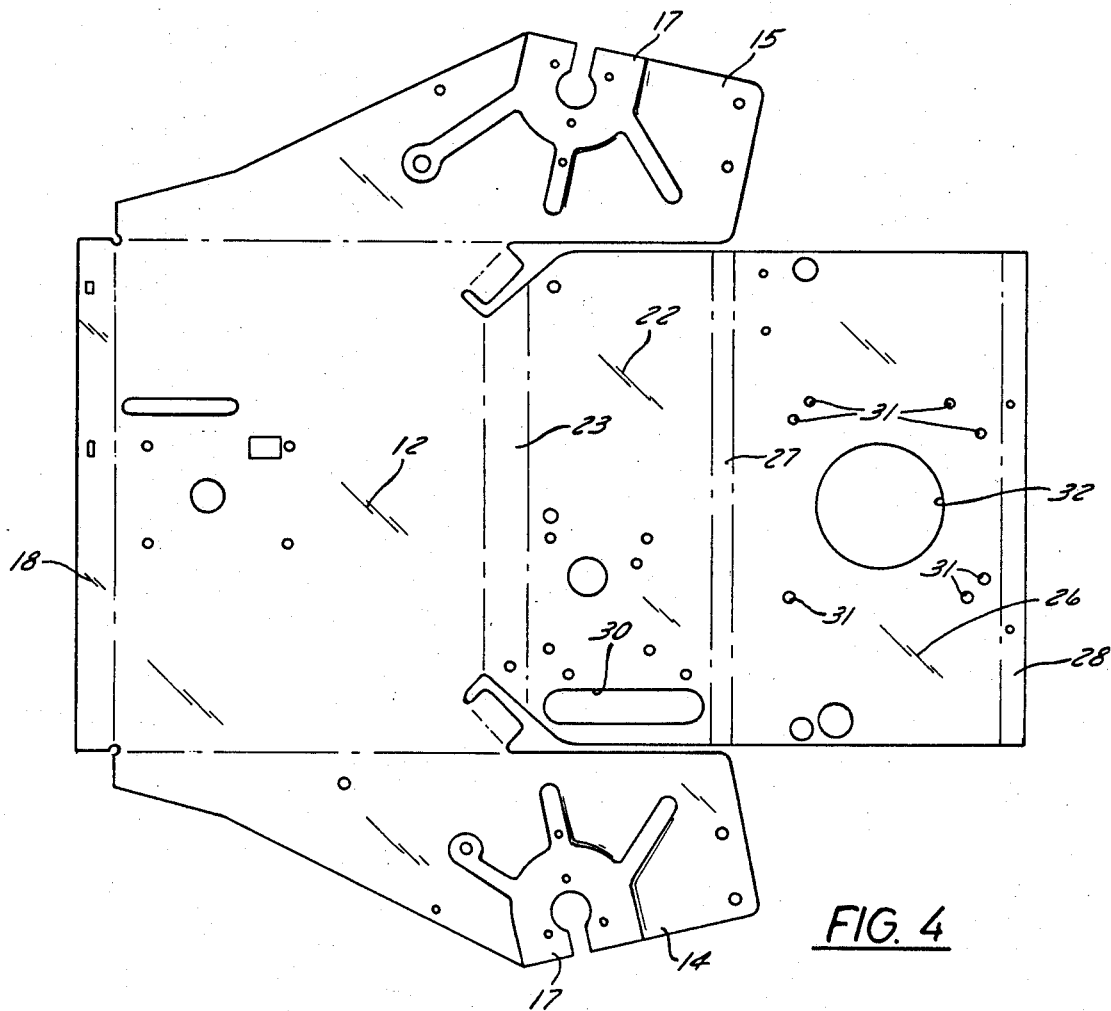
FIG. 4 is a flat layout view of the sheet steel blank and before it is stamped into the portion of the frame of the present invention.
Figure 5:
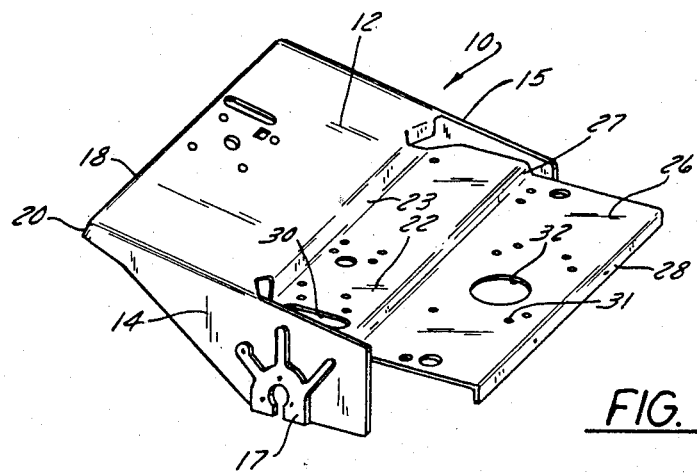
FIG. 5 is a perspective view of the stamped sheet steel component of the frame.

The main frame of the mower assembly is shown in FIG. 2 and this unitized frame includes the stamped sheet steel component 10 (see also FIGS. 4 and 5) having a forward end which includes an upwardly and forwardly inclined portion 12 that forms an operator's footrest and also forms a mounting for the steering column. The portion 12 has a pair of downwardly extending opposite side portions 14 and 15 which are formed integrally therewith and which form front wheel axle supports. A reinforcing gusset 17 is stamped into each of the downwardly extending side portions and act to reinforce the front wheel axle supports. A front edge 18 is also formed by stamping and the juncture between the side portions 14, 15 and the flange 18 are welded as at 20 and ground to a smooth finish. The stamped sheet steel component 10 also has an intermediate stepped portion 22 to which it is connected by the vertical wall 23 (FIG. 4). This stepped portion 22 forms a mounting for the transmission T.

The sheet steel component 10 also includes a rear stepped portion 26 which is connected by the intervening wall 27 to the stepped portion 22. Portion 26 provides a mounting for the engine E. A rear flange 28 terminates the rearward end of the component 10.

An elongated aperture 30 is formed in the stepped portion 22 for mounting the transmission T. Aperture 31 in portion 26 provides for mounting the engine E. A large aperture 32 formed in the stepped portion 26 is for receiving the drive shaft (not shown) of the engine E.

It will thus be appreciated that the component 10 is formed of heavy sheet steel construction and a particularly rigid and strong component is formed by means of the stepped portions and side wall portions.

The unitized frame also includes a pair of transversely spaced steel beams 40 and 41, one extending longitudinally along each side and rearwardly from the sheet steel component 10. The beams are welded adjacent their front ends and along a portion of their length to the sheet steel component. These beams are of rectangular cross-section and have a major cross-sectional axis extending in a vertical direction by means of which they are particularly strong and rigid in supporting the various parts of the tractor. It will be noted the beams converge towards one another as at 42 to thereby form a rear end of the frame which is transversely narrower than the front end. This rear end of the frame 45 has a generally U-shaped steel member 50 welded therebetween. The member 50 has a pair of downwardly extending flanges 51 to which the steerable rear wheels of the tractor are mounted. This stamped sheet steel member 50 also enhances the rigidity and strength of the unitized frame.

If a more complete description of the structure and operation of the previously mentioned platform 8, the rear wheel assembly, or associated parts in that area of the tractor is deemed to be either necessary or desirable, reference may be had to the co-pending application Ser. No. 047,931, filed May 7, 1987, and which has been assigned to an assignee common with the present invention.

The unitized frame provided for a self-propelled lawn mower in accordance with the present invention provides exceptionally good support for the engine, transmission, front axle mounting, and the steering column. Because of the stamped sheet steel component 10 and its weldment to the beams 40 and 41, a particularly strong and rigid frame construction is provided, all at a relatively low cost and with good manufacturing efficiencies.

What is claimed as the invention is:

1. A unitized frame for a self-propelled lawn mower, said frame fabricated from stamped sheet steel and steel beams and comprising:
   a stamped sheet steel component having a forward end including an upwardly and forwardly inclined portion forming an operator's foot rest, said portion also having a pair of downwardly extending opposite side portions formed integrally therewith and which form front wheel axle supports,
   said sheet steel component also forming an intermediate stepped portion forming a transmission mounting,
   said sheet steel component also forming a rearward stepped portion forming an engine mounting,
   said unitized frame also including a pair of transversely spaced steel beams, one extending longitudinally along each side and rearwardly from said sheet steel component, said beams being welded adjacent their front ends to said sheet steel component,
   and a rear wheel mounting member welded to and between the rear ends of said pair of beams.

2. The unitized frame as described in claim 1 including reinforcing gussets stamped into said downwardly extending opposite side portions and for reinforcing said front wheel axle supports.

3. The frame set forth in claim 1 further characterized in that said rear wheel mounting member is of generally U-shaped cross-section and is fabricated from sheet steel,
   said member having means for pivotally mounting a pair of rear, steerable wheels about a fore-and-aft extending axis.

4. The frame set forth in claim 1 further characterized in that said beams are of rectangular cross-section and having a major cross-sectional axis extending in a vertical direction,
   said beams converge toward one another for a distance intermediate their length to form a rear end of said frame which is transversely narrower than said forward end, and said rear wheel mounting member is welded to said narrower rear end.

5. A unitized frame for a self-propelled lawn mower, said frame fabricated from stamped sheet steel and steel beams and comprising:
   a stamped sheet steel component having a forward end including an upwardly and forwardly inclined portion forming an operator's foot rest, said portion also having a pair of downwardly extending opposite side portions formed integrally therewith and which form front wheel axle supports,
   reinforcing gussets stamped into said downwardly extending opposite side portions and for reinforcing said front wheel axle supports,
   said sheet steel component also forming an intermediate stepped portion forming a transmission mounting,
   said sheet steel component also forming a rearward stepped portion forming an engine mounting,
   said unitized frame also including a pair of transversely spaced steel beams, one extending longitudinally along each side and rearwardly from said sheet steel component, said beams being welded adjacent their front ends to said sheet steel component,
   and a rear wheel mounting member of generally U-shaped cross-section fabricated from sheet steel and welded to and between the rear ends of said pair of beams, said member having means for pivotally mounting a pair of rear, steerable wheels about a fore-and-aft extending axis, said beams being of rectangular cross-section and having a major cross-sectional axis extending in a vertical direction,
   said beams converging toward one another for a distance intermediate their length to form a rear end of said frame which is transversely narrower than said forward end, and said rear wheel mounting member is welded to said narrower rear end.

6. A unitized frame for a self-propelled lawn mower comprising:
   a stamped sheet steel component having a forward end including an upwardly and forwardly inclined portion forming an operator's foot rest, said portion also having a pair of downwardly extending opposite side portions formed integrally therewith and which form front wheel axle supports,
   said sheet steel component also forming a transmission mounting,
   said sheet steel component also forming an engine mounting,
   said unitized frame also including a pair of transversely spaced steel beams, one extending longitudinally along each side and rearwardly from said sheet steel component, said beams being welded adjacent their front ends to said sheet steel component,
   and a rear wheel mounting member welded to and between the rear ends of said pair of beams.

7. The unitized frame as described in claim 6 including reinforcing gussets stamped into said downwardly extending opposite side portions and for reinforcing said front wheel axle supports.

8. The frame set forth in claim 6 further characterized in that said rear wheel mounting member is of generally U-shaped cross-section and is fabricated from sheet steel.

9. The frame set forth in claim 6 further characterized in that same beams are of rectangular cross-section and having a major cross-sectional axis extending in a vertical direction, said beams converging toward one another for a distance intermediate their length to form a rear end of said frame which is transversely narrower than said forward end, and said rear wheel mounting member is welded to said narrower rear end.

* * * * *